B. E. THOMAS.
FLEXIBLE COUPLING.
APPLICATION FILED FEB. 12, 1919.
1,325,545.
Patented Dec. 23, 1919.
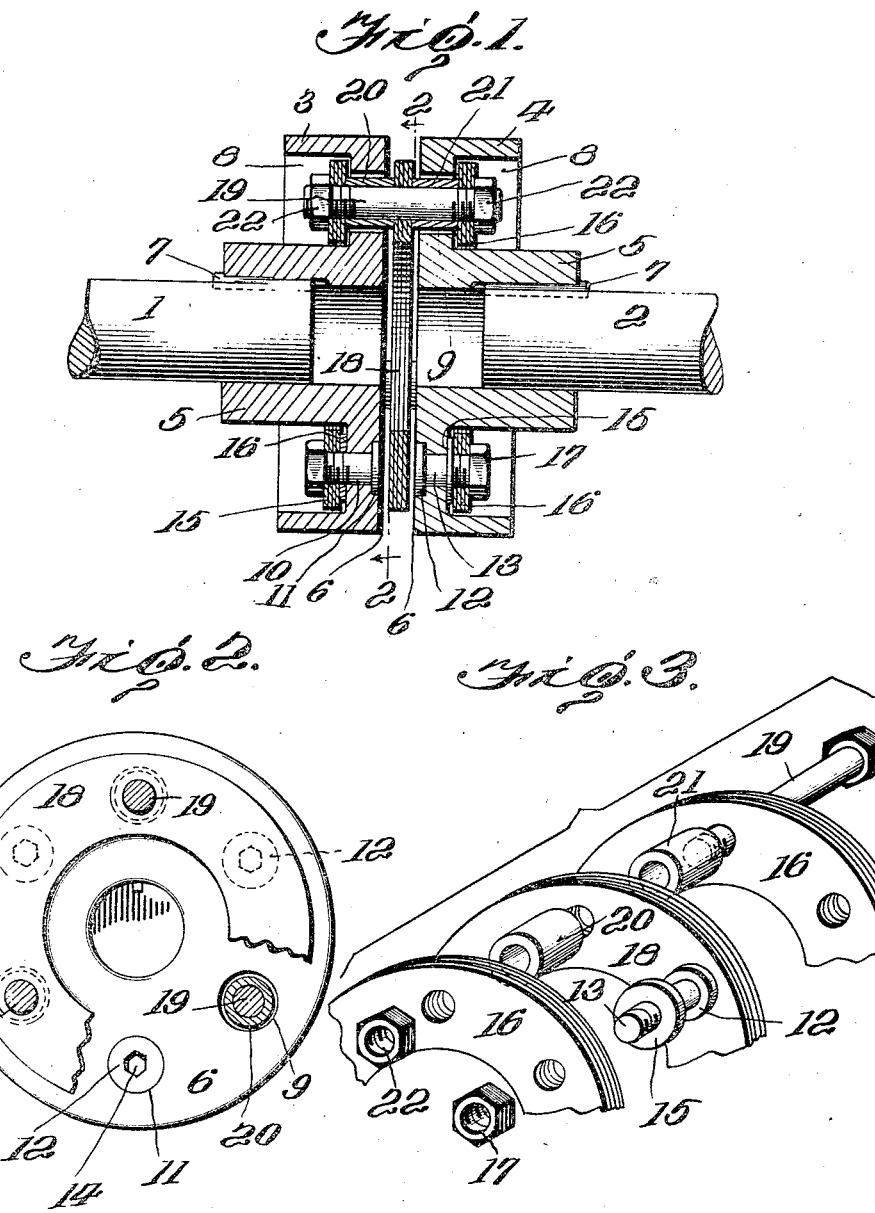
Inventor
Bertha E. Thomas.
By
Attorney

UNITED STATES PATENT OFFICE.

BERTHA E. THOMAS, OF ERIE, PENNSYLVANIA.

FLEXIBLE COUPLING.

1,325,545.  Specification of Letters Patent.  Patented Dec. 23, 1919.

Application filed February 12, 1919. Serial No. 276,534.

*To all whom it may concern:*

Be it known that I, BERTHA E. THOMAS, a citizen of the United States, residing at Erie, in the county of Erie and State of Pennsylvania, have invented certain new and useful Improvements in Flexible Couplings, of which the following is a specification, reference being had therein to the accompanying drawing.

This invention relates to certain new and useful improvements in flexible shaft couplings, and is an improvement upon the construction of coupling shown in my application Serial Number 221,892, filed March 12, 1918; the object being to provide a construction of coupling which is exceedingly simple and cheap in construction, the parts being so arranged and connected that they can be easily placed in position on the ends of the shafts to be connected, or removed therefrom.

Another object of my invention is to provide a construction of flexible coupling in which the flexibility is increased to permit each section to assume an angular position without affecting the transmission of power; the intermediate flexible ring being so mounted in connection with the coupling members that the same can be readily removed.

Other and further objects and advantages of the invention will be hereinafter set forth and novel features thereof defined by the appended claims.

In the drawings:

Figure 1 is a vertical longitudinal section through the complete coupling.

Fig. 2 is a section taken on line 2—2 of Fig. 1, and

Fig. 3 is a perspective view of the flexible rings and connecting members showing the relative positions.

Like numerals of reference refer to like parts in the several figures of the drawing.

In the drawing 1 and 2 represent respectively a driven and a driving shaft, which are adapted to be connected for transmitting power. Fixed on the shafts 1 and 2 are duplicate coupling members 3 and 4 which are preferably circular in form and are identical and the description of one will be sufficient for both.

Each coupling member is provided with a hub 5, and a flat inner face 6, the hub being adapted to receive the shaft, in which it is secured by a key 7, and while I have shown in the drawing the shafts secured within the coupling members in a particular manner, I do not wish to limit myself to the construction shown, as the coupling members can be secured on the shafts in any way desired, without departing from the spirit of my invention. The construction shown enables the coupling members to be placed in position on the ends of a pair of shafts without removing the shafts from their bearings.

An annular groove 8 is formed in the outer face of each coupling member surrounding the hub, and each coupling member is provided with an annular series of openings 9 and 10, the opening 9 having a diameter greater than the diameter of the openings 10. Annular recesses 11 are formed around the inner ends of the openings 10 to provide seats for the heads 12 of bolts 13 which extend into the recesses 8. The bolts 13 are provided with wrench-receiving recesses 14 in their heads, as clearly shown in Fig. 2.

The openings 9 and 10 are alternately arranged, one of the openings 10 being arranged between each pair of openings 9. Arranged on the ends of the bolts 13 within the recesses 8, are flexible washers 15 for holding laminated flexible rings 16 spaced from the bottom of the annular recesses of the coupling member. The laminated ring is provided with openings in alinement with the openings 9 and 10 of the coupling member, and after the laminated ring has been placed in position on the bolt, it is secured to the member by nuts 17, so as to hold the same in spaced relation to the coupling member, and by this construction each coupling member is complete in itself.

After a coupling member has been secured on the end of each of the shafts to be connected, a flexible laminated ring 18 is arranged in the space between the coupling members and a bolt 19 is forced through the openings of the rings 16 and similar openings in the ring 18, said bolts passing through the openings 9 of the coupling members 3 and 4. Sleeves 20 and 21 are placed on the bolts 19 which have diameters less than the diameter of the opening 9, so as to allow a slight movement. The sleeves 20 and 21 hold the flexible rings spaced from the inner and outer faces of the coupling members and in assembling the same, the sleeves are placed in position before the bolts are inserted. Nuts are then placed on the ends of the bolts and screwed into engagement with the adjacent laminated ring, which binds the two flexible rings together in such a manner that the coupling member can assume an angular position in respect to each other without affecting the transmission of power.

From the foregoing description, it will be seen that I have provided a flexible coupling in which a pair of coupling members are arranged on the ends of the shafts to be connected having flexible laminated rings secured on the outer faces in spaced relation thereto in connection with an intermediate flexible ring, which is arranged in spaced relation with the inner faces of the coupling members, the coupling members being secured together by bolts extending longitudinally through the coupling members and laminated flexible rings, whereby an exceedingly flexible coupling is provided.

While I have shown laminated rings, I do not wish to limit myself to the use of these rings, as flexible rings can be used, and I have found by experimenting that a flexible ring can be substituted for the intermediate laminated ring and good results obtained.

I claim:

1. A flexible shaft coupling comprising a pair of coupling members, each coupling member having a flexible laminated ring secured on the outer face thereof and spaced therefrom, an intermediate laminated flexible ring and bolts for connecting the flexible rings and coupling members together.

2. A flexible shaft coupling comprising a pair of coupling members adapted to be secured to the ends of the shafts to be connected, a flexible ring arranged on the outer face of each coupling member, and spaced therefrom, a flexible ring arranged between said coupling member and means for alternately securing said rings together and to the respective coupling members.

3. A flexible shaft coupling comprising a pair of coupling members, each coupling member having a flexible laminated ring secured to the outer face thereof and spaced therefrom, a flexible laminated ring arranged between said coupling members, bolts for connecting the flexible rings of the two coupling members and intermediate ring together, and sleeves carried by said bolt having their ends in engagement with said flexible rings.

4. In a shaft coupling, the combination of coupling members adapted to be attached to the shaft sections to be connected, laminated flexible rings arranged on the outer face of each coupling member, and secured thereto, a flexible laminated ring arranged between said coupling members, and bolts passing longitudinally through said coupling members and flexible rings carrying sleeves having their ends in engagement with said flexible rings.

5. A flexible shaft coupling comprising a pair of duplicate coupling members adapted to be secured to the ends of the shafts to be connected, said coupling members being provided with openings, laminated flexible rings arranged on the outer face of each of said coupling members having openings registering with the openings thereof, a flexible ring arranged between said coupling members, and bolts arranged in said openings for alternately connecting the outer laminated rings together and said rings to the respective coupling members, the bolts connecting the laminated rings passing through the intermediate flexible ring.

6. A flexible shaft coupling comprising a pair of duplicate circular coupling members having spaced openings, flexible rings secured on the outer faces of said coupling members, a flexible ring disposed between said coupling members, bolts passing longitudinally through said coupling members and flexible rings for connecting said members, and means carried by said bolts for holding said flexible rings spaced from said coupling members.

In testimony whereof I hereunto affix my signature in the presence of two witnesses.

BERTHA E. THOMAS.

Witnesses:
 EDNA M. SCHUWERK,
 HARRY M. SCHUWERK.